Figures 1, 2:
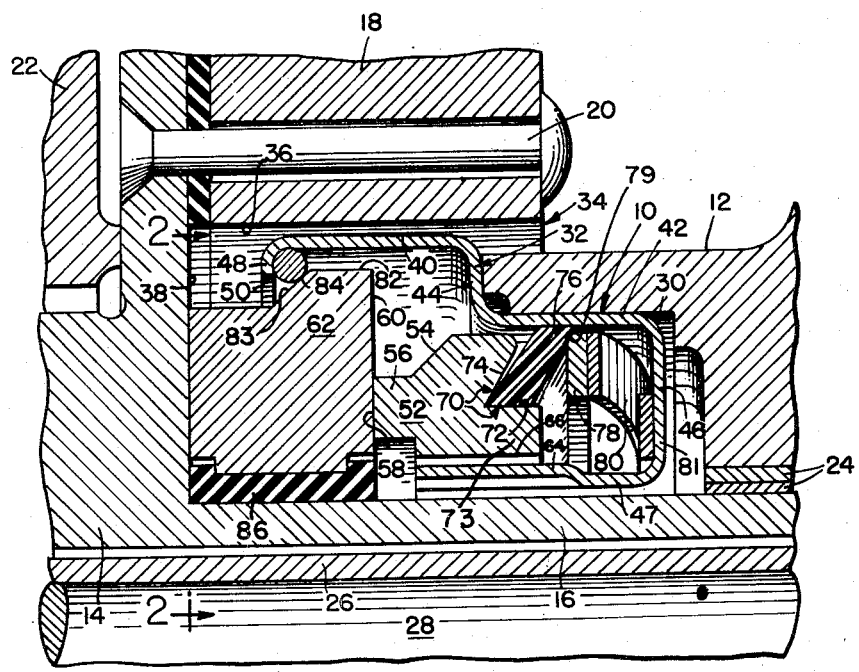

Jan. 27, 1959 F. E. PAYNE 2,871,040
ROTARY MECHANICAL SEAL
Filed Sept. 7, 1955

INVENTOR:
FRANK E. PAYNE
BY
Edward R. Sounders

United States Patent Office 2,871,040
Patented Jan. 27, 1959

2,871,040
ROTARY MECHANICAL SEAL

Frank E. Payne, Glencoe, Ill., assignor to Crane Packing Company, Chicago, Ill., a corporation of Illinois Application September 7, 1955, Serial No. 532,871

3 Claims. (Cl. 286—11.14)

The present invention relates to rotary mechanical seals for effecting a seal between relatively rotatable machine elements. More specifically, the invention relates to an improved form of end face seal wherein the sealing effect is attained by the face-to-face running contact between two relatively hard materials as for example between metal-to-metal parts or between metal-to-carbon parts.

The improved seal comprising the present invention has been designed primarily for use in connection with hydraulic torque converter mechanism for installation as a package-type seal within a recess provided in the gear pump casing of the transmission in such a manner that the seal assembly will effectively prevent leakage of fluid along the pump hub which extends through an opening provided in the pump casing. Accordingly, the seal has been illustrated herein as being associated with such a torque converter mechanism, but it will, of course, be understood that other uses are contemplated for the present seal assembly in special applications and the nature of the present seal is such that it will be found particularly useful where relatively high temperatures in the neighborhood of 275° F. are encountered, in steam installations where high temperatures and high pressures are not uncommon, as well as in chemical manufacturing or treating installations where corrosive liquids are pumped under pressure at high temperatures. Irrespective however of the particular use to which the present invention may be put, the essential features of the same are at all times preserved.

It is among the principal objects of the present invention to provide a unitary compact package-type seal including a sealing washer having a radial flat sealing surface designed for running sealing engagement with a similar sealing surface provided on a sealing seat, the washer being disposed within a cup-shaped retainer capable of being pressed into position within a recess provided in one of the relatively rotatable elements undergoing sealing, and the washer being formed with an annular or external recess extending therearound and having an outwardly facing cylindrical wall arranged in opposition to a surrounding cylindrical wall provided on the retainer, together with a novel and effective form of sealing ring designed for interpositioning between the cylindrical wall of the recess in the washer and the cylindrical wall of the retainer as well as means for causing the sealing ring to bear in opposite directions against the two cylindrical walls so that a sealing action will be attained with the sealing ring being pressed firmly into engagement by a wedging action with the two cylindrical surfaces against which it bears.

A still further object of the invention is to provide a seal of this character in which the recess provided in the sealing washer is formed with a bottom wall which normally assumes a position in close proximity to the sealing ring and in which the bottom wall of the recess and a surface of the sealing ring oppose each other at a slight angle in such a manner that when sealing pressure is applied to the sealing ring, surface increments on the sealing ring are caused to progressively bear against the recess bottom whereby the sealing ring will make sealing contact with the recess bottom as well as with the outwardly facing cylindrical wall of the recess and effectively prevent passage of fluid around the sealing ring and between the same and the sealing washer.

Yet another object of the invention is to provide a novel form of cartridge or package-type seal wherein the retainer or seal housing serves to retain and at least partially enclose both relatively rotatable elements, each element being of a size whereby the same may be readily installed within the retaining shell, and including novel means in the form of a split retaining ring which may be inserted into the retainer shell as the last step in the assembly operation of the seal and which retaining ring not only serves to lock the rotatable elements within the retainer but also serves to center one of the relatively rotatable elements in the assembly for proper alignment with the other rotatable element.

Another object of the invention is to provide a seal of the character briefly outlined above in which the seal parts are so designed that the overall seal assembly may be made relatively short, thereby enabling the same to be installed within a relatively small space. In carrying out this last mentioned object, the invention contemplates the provision of a sealing ring and cooperating sealing washer which are so designed that an extremely sufficient sealing action may be obtained by the application of a small amount of pressure to the ring thus enabling the use of a fairly light leaf-type spring which occupies but little space within the seal assembly.

Other objects and advantages of the invention not at this time enumerated will become more readily apparent as the nature of the invention is better understood.

In the accompanying single sheet of drawings forming a part of this specification a preferred embodiment of the invention has been shown.

In these drawings:

Fig. 1 is a longitudinal sectional view taken substantially centrally through the improved seal showing the same operatively installed within a torque converter construction, and Fig. 2 is a sectional view taken substantially along the line 2—2 of Fig. 1.

Referring now to the drawings in detail, the seal assembly comprising the present invention is designated in its entirety at 10 and it is shown operatively installed in a hydraulic torque converter mechanism, this illustration being purely exemplary inasmuch as the seal assembly is capable of installation in other mechanism having relatively rotatable parts. Only such portions of the torque converter assembly as are pertinent to the use of the present seal 10 have been illustrated and among these parts are the outer housing 12 of the front oil pump which is of the meshing gear type; the pump hub 14 including a sleeve-like extension 16; the torque converter housing 18 to which the hub 14 is secured as for example by means of rivets 20; and a fragment of one of the torque converter vanes 22. The sleeve 16 is rotatably journaled by a suitable sleeve bearing 24 in the gear pump housing 12. A central sleeve 26 operatively connected to the torque converter impeller and the transmission driven shaft 28 are incidental disclosures having no particular relation to the present seal assembly.

The gear pump housing 12 is rotatable relative to the pump hub 16 and it is necessary to effect a fluid seal between these two parts. Accordingly, the pump casing 12 is provided with an annular recess 30 therein into which there is pressed a retainer element 32 associated with the seal assembly 10. The pump hub 14 is secured to the torque converter housing 18 in such a manner that these two parts cooperate to produce a relatively deep recess 34 having a cylindrical wall 36 and a radial wall 38. The forward end of the pump casing 12 projects a slight distance into the recess 34 and the seal assembly is contained partially within the recess 30 and partially within the recess 34 between the end of the pump housing 12 and the bottom wall 38 of the recess 34.

The shell-like retainer 32 includes a cylindrical portion 40 of relatively large diameter, a reduced cylindrical portion 42 which is pressed into the recess 30, an interconnecting radial wall 44 and an end wall 46 which presents a slight clearance from the bottom of the recess 30. The retainer 32 is also provided with an inner cylindrical wall 47 or centerpost which extends forwardly from the end wall 46. The retainer is provided with an open rim 48 which is turned radially inwardly to provide a central opening 50.

Disposed within the retainer 32 is a sealing washer 52 including a body portion 54 and a forwardly extending nose piece 56 having a forward face 58 which is lapped to a high degree of flatness and which is designed for running engagement with a similarly lapped flat face 60 provided on the rear side of a seal seat assembly designated in its entirety at 62 and which seat constitutes, in the main, the subject matter of the present invention.

The washer 52 is telescopically received over the centerpost 47 of the retainer 32 and the latter is formed with a pair of diametrically opposed, longitudinally extending outwardly struck ribs 64 which extend into a pair of longitudinal grooves 66 provided in the central opening through the washer 52 and the interlocking ribs and grooves just mentioned constitute a driving means whereby the washer may be driven from the seal housing through the retainer shell 32.

The washer 52 is provided with an annular outwardly presented recess 70 in its rear face, this recess creating a central cylindrical hub-like rearward extension 73 on the washer, the hub having a cylindrical wall 72 and the latter, in combination with a frusto-conical bottom wall 74 defining the annular recess 70. In order to seal the washer 52 to the retainer shell 32 and prevent passage of fluid around the rear side of the washer, a continuous unbroken sealing ring 76 in the form of a cone frustum and which is preferably formed of a material that is relatively incompressible, as for example the polytetrafluoroethylene polymer known as "Teflon," extends between the outwardly facing cylindrical surface 72 and the inwardly facing cylindrical surface afforded by the cylindrical portion 42 of the retainer. "Teflon" is the tradename of E. I. du Pont de Nemours & Co. and is described in Industrial and Engineering Chemistry, vol. 38, page 870, September 1946.

A thrust washer 78 has its outer peripheral region bearing against the rear face of the sealing ring 76 at a region adjacent the outer peripheral edge of the latter. A circular leaf spring 80 of sinuous design and which is flat in cross section is disposed between the rear wall 46 of the retainer and the thrust washer 78 and normally urges the latter forwardly into engagement with the sealing ring 76. The spring 80 is provided with a series of outwardly struck spring fingers 81 by means of which the spring as a whole may seat squarely against the rear wall 46 of the retainer.

The slant height of the frusto-conical sealing ring 76 is somewhat greater than the radial distance between the surface 72 and the cylindrical wall 42 of the retainer so that the forward pressure exerted by the thrust washer 78 against the sealing ring 76 will cause a wedging action of the sealing ring 76 to obtain whereby the body of the frusto-conical ring tends to straighten out in radial fashion but is prevented from doing so by the space limitations provided for it. In this manner a strong wedging action is attained so that an effective seal occurs both at the inner and outer peripheries of the frusto-conical sealing ring 76.

It is to be noted that the slant angle of the frusto-conical wall 74 at the bottom of the recess 70 in the washer 52 is slightly greater than the slant angle of the forward frusto-conical surface of the sealing ring 76 so that there is a slight deviation or divergence between these two surfaces. Thus, due to the inherent nature of the material of which the sealing ring 76 is formed, wherein the material is susceptible to a certain degree of "cold flow" the application of pressure forwardly on the sealing ring 76, either by virtue of the spring 80 or by virtue of hydraulic pressure built up within the seal structure, will cause the material of the ring 76 to progressively engage the frusto-conical bottom wall 74 so that the latter will act as a backing wall for the ring to prevent collapse of the same while at the same time enhancing the sealing action between the ring and the sealing washer 52. It is also to be noted that the thrust washer 78 exerts pressure forwardly on the sealing ring 76 at a region near the outer periphery of the ring and in order that this pressure may be distributed over a wider surface area of the ring, the forward outer edge of the thrust washer 78 is rounded as at 79. By such an arrangement there is no tendency for the washer 78 to sever the material of the sealing ring 76 and a more equal distribution of wedging force is applied to the ring with this force being more or less evenly distributed against the cylindrical wall 42 of the retainer.

The seal seat 62 may be formed of cast iron and is in the form of a cylindrical ring having a radially extending enlargement 82 at its rear end which is wholly contained within the cylindrical confines of the retainer 32. The enlargement 82 is formed with a forwardly facing conical surface 83. The forward portion of the seat 62 projects outwardly through the opening 50 at the rim of the retainer and a split metal retaining ring 84 is interposed between the conical surface 83 and inturned rim 48 of the retainer to prevent removal of the seat from the retainer thus providing a package-type seal assembly unit capable of being installed bodily and in its entirety in the space provided for it between the relatively movable parts 12 and 14 of the torque converter mechanism. It is to be noted that the overall diameter of the enlargement 82 is less than the diameter of the opening 50 so that the seat normally may be inserted into the retainer through the opening 50. The inner diameter of the retaining ring 84 is smaller than the diameter of the opening 50 and also is smaller than the overall diameter of the enlargement 82 so that the ring, when in position within the retainer, will engage the conical surface 83 and serve to center the seat axially within the opening 50 when the seal is in its free state.

The seat member 62 is preloaded upon the sleeve-like extension 16 of the pump hub 14 by means of an elastomeric sleeve 86 which surrounds the sleeve 16 and is interposed between the seat member 62 and sleeve. The sleeve 86 is maintained under compression and establishes a driving connection between the pump hub and the seat member 62 so that these two members will rotate in unison with the seat turning relative to the washer 52. When the seal assembly 10 exists in an actual installation, the seat member 62 may be forced rearwardly within the retainer or shell 32 a sufficient distance that the snap ring 84 hugs the cylindrical wall 40 of the retainer and remains clear of the conical surface 83 provided on the seat.

The invention is not to be limited to the exact arrangement of parts shown in the accompanying drawing or described in this specification since various changes in the details of construction of the seal may be resorted to without departing from the spirit of the invention. For example, while the illustrated embodiment of the seal shows the seat member or assembly 62 operatively embodied in a package-type seal with a portion of the seat projecting outwardly through the opening 50 at the front of the retainer 32, the seat member may be omitted and the washer 52 may be caused to project outwardly through the opening 50 and maintained against dislodgement from the seal assembly by a suitable snap ring such as the ring 84. The washer may then be designed for running sealing engagement with an external seat member having a surface normal to the axis of the washer and relatively rotatable with respect to the washer. Furthermore, either of the seal elements 52 or 62 respectively, may be maintained within the seal assembly by means other than that illustrated for holding the seat 62 in place. If the forward rim of the retainer 32 is flanged inwardly as at 48 so as to overlap the outer periphery of either seal element, the latter will be effectively held within the retainer 32 and the provision of the snap ring 84 may be dispensed with. Only insofar as the invention has been particularly pointed out in the accompanying claims is the same to be limited.

I claim:

1. In a seal for relatively rotatable concentric inner and outer elements, in combination, a washer adapted to surround the inner element and having a central cylindrical bore therethrough and a front face providing a radial sealing surface, said washer being formed with a rearwardly and outwardly facing annular recess the side wall of which is generally of cylindrical configuration defining a central hub-like rearward extension of the washer, said recess having a frusto-conical bottom wall inclined radially outwardly and rearwardly from the forward end of said hub-like extension, a retainer adapted to surround said inner element and having a cylindrical centerpost extending into said washer, an outer cylindrical wall surrounding said washer and having an open forward end, and an interconnecting radial wall extending between the outer cylindrical wall and centerpost rearwardly of said washer, a continuous unbroken annular sealing ring formed of a material having a substantial degree of resistance to compressional forces but subject to a slight degree of cold flow, said sealing ring being in the form of a continuous hollow cone frustum having a slant height greater than the radial distance between the cylindrical wall of the hub-like extension of the washer and the inner cylindrical surface of the outer cylindrical wall of the retainer and having a slant angle slightly less than the slant angle of the frusto-conical bottom wall of the recess in said washer, said sealing ring being interposed between the cylindrical wall of the hub-like portion of the washer and said inner cylindrical surface on the retainer with its outer conical surface in opposition to the frusto-conical portion of said bottom wall and with the small and large bases thereof contiguous to the cylindrical wall of the hub-like extension of the washer and the inner cylindrical surface of the retainer respectively, a seat member adapted to suround said inner element and positioned forwardly of said washer, said seat member having a radial surface designed for running engagement with the radial sealing surface on said washer, a resilient sleeve interposed between said seat member and inner element and compressed therebetween and serving to support said seat member on the inner element against relative rotation with respect thereto, said seat member being disposed at least partially within the outer cylindrical wall of the retainer and having a portion thereof projecting outwardly through the open forward end of the latter, said seat member being provided with a forwardly facing shoulder disposed within the retainer and means carried by the forward open end of the retainer and engageable with said shoulder for preventing removal of said seat member outwardly through the forward end of the retainer, and thrust means interposed between the radial wall of the retainer and the inner conical surface of said frusto-conical sealing ring yieldingly applying axial pressure to said sealing ring in a direction to wedge the material of the sealing ring into sealing engagement with said cylindrical wall of the hub-like extension of the washer and the inner cylindrical surface of the retainer and to force the same into engagement with said bottom wall of the recess whereby said bottom wall constitutes a backing surface for the material of said sealing ring.

2. In a sealing device for relatively rotatable elements, in combination, means on one of said elements establishing a radially disposed annular flat sealing surface, means on the other element providing a cylindrical surface, a sealing washer concentric with said cylindrical surface and capable of limited axial shifting movement relative thereto, said washer having an annular flat sealing surface formed thereon designed for running sealing engagement with said other sealing surface, there being an axial recess in said washer providing a cylindrical wall concentric with, opposed to and spaced from said cylindrical surface, said recess having an annular bottom wall provided with a frusto-conical portion, a continuous annular sealing ring formed of a material having a substantial degree of resistance to compressional forces but subject to a slight degree of cold flow, said sealing ring being in the form of a continuous hollow cone frustum devoid of radial slits and having a slant height greater than the radial distance between said cylindrical wall of the recess and the cylindrical surface of said other element, and having a slant angle slightly less than the slant angle of the frusto-conical portion of said bottom wall of the recess in said washer, said sealing ring being interposed between the cylindrical wall of the recess in said washer and the cylindrical surface on said other element, with the bases thereof contiguous to the cylindrical wall of said recess and the cylindrical surface of said other element respectively, thrust means normally applying axial pressure to said sealing ring solely over an annular region adjacent the base thereof which is contiguous to said cylindrical surface of said other element in a direction to wedge the material of said sealing ring into sealing engagement with said cylindrical wall of the washer and cylindrical surface of said other element, and to force the same into engagement with said bottom wall, and means establishing a driving connection between said other element and said sealing washer whereby the application of torque to said sealing ring by the cylindrical wall surface of the washer and the cylindrical surface of said other element is eliminated.

3. In a seal for relatively rotatable concentric inner and outer elements, in combination, a washer adapted to surround the inner element and having a bore therethrough and a front face providing a radial sealing surface adapted to bear against a surface normal to and fixed relative to the inner element, said washer having a central hub-like rearward extension and a frusto-conical bottom wall inclined radially outwardly and rearwardly from the forward end of said hub-like extension, a retainer adapted to surround said inner element and having a cylindrical wall portion at least partially surrounding said washer, and a radial wall extending rearwardly of said washer, a continuous unbroken annular sealing ring formed of a material having a substantial degree of resistance to compressional forces but subject to a slight degree of cold flow, said sealing ring being in the form of a continuous hollow cone frustum having a slant height greater than the radial distance between the outer cylindrical wall of the hub-like extension of the washer and the inner cylindrical surface of the cylindrical wall of the retainer and having a slant angle slightly less than the slant angle of the frusto-conical bottom wall of the washer, said sealing ring being interposed between the outer cylindrical wall of the hub-like portion of the washer and said inner cylindrical surface on the retainer with its outer conical surface in opposition to the frusto-conical portion of said bottom wall and with the small and large bases thereof contiguous to the outer cylindrical wall of the hub-like extension of the washer and the inner cylindrical surface of the retainer respectively, and thrust means interposed between the radial wall of the retainer and a narrow annular region of the frusto-conical sealing ring disposed near the outer periphery of the sealing ring, said thrust means yieldingly applying axial pressure to said sealing ring in a direction to wedge the material of the sealing ring into sealing engagement with the hub-like extension of the washer and the retainer and to force the ring into engagement with said bottom wall whereby said bottom wall constitutes a backing surface for the material of said sealing ring.

References Cited in the file of this patent

UNITED STATES PATENTS

| | | |
|---|---|---|
| 2,049,955 | Gilbert | Aug. 4, 1936 |
| 2,365,046 | Bottomley | Dec. 12, 1944 |
| 2,701,154 | Dolhun | Feb. 1, 1955 |

FOREIGN PATENTS

| | | |
|---|---|---|
| 596,089 | Germany | May 3, 1934 |